United States Patent
Kasahara et al.

(10) Patent No.: US 9,815,953 B2
(45) Date of Patent: *Nov. 14, 2017

(54) CALCIUM CARBONATE FILLER FOR RESIN, AND RESIN COMPOSITION CONTAINING SAID FILLER

(71) Applicant: MARUO CALCIUM CO., LTD., Akashi-shi (JP)

(72) Inventors: Hidemitsu Kasahara, Hyogo (JP); Shigeo Takiyama, Hyogo (JP)

(73) Assignee: MARUO CALCIUM CO., LTD., Akashi-shi (JP)

( * ) Notice: Subject to any disclaimer, the term of this patent is extended or adjusted under 35 U.S.C. 154(b) by 337 days.

This patent is subject to a terminal disclaimer.

(21) Appl. No.: 14/432,310

(22) PCT Filed: Oct. 11, 2013

(86) PCT No.: PCT/JP2013/077782
§ 371 (c)(1),
(2) Date: Mar. 30, 2015

(87) PCT Pub. No.: WO2014/058057
PCT Pub. Date: Apr. 17, 2014

(65) Prior Publication Data
US 2015/0240040 A1    Aug. 27, 2015

(30) Foreign Application Priority Data
Oct. 12, 2012  (JP) .................................. 2012-226637

(51) Int. Cl.
*C08K 3/26*     (2006.01)
*C09C 1/02*     (2006.01)
(Continued)

(52) U.S. Cl.
CPC ................. *C08J 5/18* (2013.01); *C01F 11/18* (2013.01); *C01F 11/185* (2013.01); *C08K 3/26* (2013.01);
(Continued)

(58) Field of Classification Search
CPC .. C09C 1/021; C08K 3/26; C08K 9/04; C08K 2003/265; C08K 2201/006; C08J 5/18;
(Continued)

(56) References Cited

U.S. PATENT DOCUMENTS

| | | | |
|---|---|---|---|
| 8,975,322 B2* | 3/2015 | Kasahara | C08K 3/26 |
| | | | 423/430 |
| 2010/0048791 A1* | 2/2010 | Vucak | C01F 11/18 |
| | | | 524/425 |

FOREIGN PATENT DOCUMENTS

| | | |
|---|---|---|
| JP | 62-207337 A | 9/1987 |
| JP | 2004-269653 A | 9/2004 |

(Continued)

*Primary Examiner* — William Cheung
(74) *Attorney, Agent, or Firm* — Kratz, Quintos & Hanson, LLP

(57) ABSTRACT

The calcium carbonate filler for a resin is provided in which a volatile component such as water present in a surface of calcium carbonate is likely to be degassed even when the filler is incorporated into and kneaded with a resin having high processing temperature at a high concentration, and foaming or the like can be suppressed. In particular, the calcium carbonate filler is useful in optical fields that require reflectivity and light resistance.

The calcium carbonate filler for a resin has a content rate of particles having a particle diameter of 0.26 μm or less is 30% or less in a number particle size distribution diameter measured from an electron micrograph, and satisfies the following expressions (a) $Dms5/Dmv5 \leq 3.0$, (b) $1.0 \leq Sw \leq 10.0$ (m$^2$/g) and (c) $Dma \leq 5.0$ (% by volume):

(Continued)

Dms5: a 5% diameter (μm) accumulated from a small particle side in a volume particle size distribution measured with a laser diffraction particle size distribution measurement device;

Dmv5: a 5% diameter (μm) accumulated from a small particle side in a number particle size distribution in a particle diameter measured with an electron microscope;

Sw: a BET specific surface area ($m^2/g$); and

Dma: a content rate (% by volume) of particles having a particle diameter of 3 μm or more in a volume particle size distribution measured with a laser diffraction particle size distribution measurement device.

10 Claims, 1 Drawing Sheet

(51) Int. Cl.
    *B32B 5/16*     (2006.01)
    *C08J 5/18*     (2006.01)
    *C01F 11/18*     (2006.01)
    *C08K 9/04*     (2006.01)

(52) U.S. Cl.
    CPC ............. *C08K 9/04* (2013.01); *C09C 1/021* (2013.01); *C01P 2004/03* (2013.01); *C01P 2004/51* (2013.01); *C01P 2006/12* (2013.01); *C01P 2006/60* (2013.01); *C01P 2006/82* (2013.01); *C08J 2367/02* (2013.01); *C08J 2367/03* (2013.01); *C08K 2003/265* (2013.01); *C08K 2201/003* (2013.01); *C08K 2201/006* (2013.01); *Y10T 428/2982* (2015.01)

(58) Field of Classification Search
CPC ... C08J 2367/02; C08J 2367/03; C08L 67/02; C01P 2004/03; C01P 2004/51; C01P 2006/12; C01P 2006/60; Y10T 428/2982; C01F 11/18; C01F 11/185
USPC .......................... 524/425; 106/465; 428/402
See application file for complete search history.

(56) References Cited

FOREIGN PATENT DOCUMENTS

| | | |
|---|---|---|
| JP | 2005-125700 A | 5/2005 |
| WO | 2006/064729 A1 | 6/2006 |
| WO | 2007/088707 A1 | 8/2007 |
| WO | 2012/073660 A1 | 6/2012 |
| WO | 2012/141236 A1 | 10/2012 |

\* cited by examiner

US 9,815,953 B2

CALCIUM CARBONATE FILLER FOR RESIN, AND RESIN COMPOSITION CONTAINING SAID FILLER

This application is a filing under 35 U.S.C. 371 of international application number PCT/JP2013/077782, filed Oct. 11, 2013, which claims priority to Japan application number 2012-026637, filed Oct. 12, 2012, the entire disclosure of each of which is hereby incorporated by reference.

TECHNICAL FIELD

The present invention relates to a calcium carbonate filler for a resin and a resin composition containing the filler. In particular, the present invention relates to a calcium carbonate filler for a resin, which is uniform in particle size including an extremely small amount of fine powders and includes an extremely small amount of a volatile component such as water, and a resin composition in which the filler is incorporated.

In the calcium carbonate filler for a resin of the present invention, the amount of a volatile component such as water to be generated is extremely small in a specific particle size range. Therefore, even when the calcium carbonate filler is incorporated into, for example, a resin such as a polyester resin and an engineering resin having a high processing temperature as well as a conventional sealant, a flooring material and an adhesive in which the calcium carbonate filler is incorporated at a high concentration, a resin composition excellent in thermal stability can be obtained.

Further, the calcium carbonate filler for a resin of the present invention includes an extremely small amount of fine powders or coarse particles, and has excellent uniformity and dispersibility of particles. Therefore, the calcium carbonate filler is useful as a micropore-forming agent for white PET used in a light reflection plate for a liquid crystal of a cell phone, a laptop computer, a television, or the like.

BACKGROUND ART

Conventionally, calcium carbonate has been incorporated at a high concentration in an application of plastisol obtained by mixing a vinyl chloride resin or an acrylic resin with a plasticizer and in a field of sealant obtained by mixing an urethane, a silicone resin, a polysulfide resin, and the like. On the other hand, among synthetic resins, for example, in a field utilizing high processing temperature such as a polyester resin typified by polyethylene terephthalate (PET) and an engineering plastic typified by polyamide (PA), polycarbonate (PC), or polyphenylene sulfide (PPS), a very small amount of calcium carbonate has been heretofore incorporated for the purpose of a light diffusing material an anti-blocking material, or the like.

For example, a porous white PET film, which is produced by a method of forming porous voids at an interface between a PET resin and a micropore-forming agent by a method for adding calcium carbonate whose particle size has been adjusted as a micropore-forming agent together with a non-compatible resin to a PET resin, and stretching the mixture into a film (sheet) (Patent Document 1), or a method for adding an inorganic fine particle such as barium sulfate to a PET resin, and stretching the mixture into a film (sheet) (Patent Document 2), has been put into practice in a wide variety of fields such as a synthetic paper, a (prepaid) card, a label and an optical reflecting film (sheet). Among them, for example, in the case of a light reflecting film utilized in liquid crystal TV application, high image quality, wide screen and low cost of liquid crystal TV are required.

PRIOR ART DOCUMENT

Patent Documents

Patent Document 1: JP 62-207337 A
Patent Document 2: JP 2005-125700 A

SUMMARY OF INVENTION

Technical Problems

When calcium carbonate is compared with other micropore-forming agents such as an organic non-compatible resin, barium sulfate and titanium oxide, calcium carbonate is not only more inexpensive, but also has higher heat resistance as compared with the organic non-compatible resin, and therefore, there is also a merit in that an edge portion (selvage portion) which is generated at the time of production of a white PET film can be recycled, and is also advantageous in respect of the environment and a yield.

Calcium carbonate has a specific gravity of as low as about 2.7 g/cm$^3$, whereas barium sulfate and titanium oxide have a specific gravity of about 4 to 4.5 g/cm$^3$, and therefore, an addition weight can be decreased to about ⅔. It is advantageous in terms of cost and weight saving. Accordingly, a white porous resin film with calcium carbonate incorporated therein is required in the market.

However, when calcium carbonate is incorporated into a white PET resin at a high concentration, there are problems such that a volatile component such as water, which is especially present in a surface of calcium carbonate fine particles, causes foaming of a white porous resin film, and calcium carbonate fine particles cause reduction in optical performance. Therefore, carbonic carbonate has been hitherto problematic in incorporation at a high concentration.

In view of the circumstances, an object of the present invention is to solve the problems, and in particular, to provide a calcium carbonate filler including an extremely small amount of fine particles, in which the degassing property of a volatile component such as water present in a surface of calcium carbonate is controlled, in order to allow for incorporation into a resin having high processing temperature at a high concentration, and further to provide a resin composition in which foaming or the like is suppressed and thermal stability is excellent even when the filler is incorporated into a resin having high processing temperature at a high concentration.

Solution to Problems

The present inventors have intensively investigated in order to solve the problems, and as a result, found that even when calcium carbonate, which includes an extremely small amount of fine powders and has a particle size adjusted to a specific particle size, is incorporated into and kneaded with a resin having high processing temperature at a high concentration, a volatile component such as water present in a surface of calcium carbonate is likely to be degassed, and foaming or the like can be suppressed. Accordingly, the present invention has been completed.

That is, a feature of the present invention is a calcium carbonate filler for a resin, in which a content rate of particles having a particle diameter of 0.26 μm or less is 30% or less in a number particle size distribution diameter measured (Mac-VIEW manufactured by Mountech Co., Ltd.) from an electron micrograph, and which satisfies the following expressions (a), (b), and (c):

$$Dms5/Dmv5 \leq 3.0 \quad (a)$$

$$1.0 \leq Sw \leq 10.0 \ (m^2/g) \quad (b)$$

$$Dma \leq 5.0 (\% \text{ by volume}) \quad (c)$$

wherein
Dms5: a 5% diameter (μm) accumulated from a small particle side in a volume particle size distribution measured with a laser diffraction particle size distribution measurement device (Microtrac MT-3300EX II manufactured by NIKKISO CO., LTD.);
Dmv5: a 5% diameter (μm) accumulated from a small particle side in a number particle size distribution in a particle diameter (Mac-VIEW manufactured by Mountech Co., Ltd.) measured with an electron microscope; Sw: a BET specific surface area (Macsorb manufactured by Mountech Co., Ltd.) (m²/g); and
Dma: a content rate (% by volume) of particles having a particle diameter of 3 μm or more in a volume particle size distribution measured with a laser diffraction particle size distribution measurement device (Microtrac MT-3300EX II manufactured by NIKKISO CO., LTD.).

Another feature of the present invention is the calcium carbonate filler for a resin, wherein the calcium carbonate filler is surface-treated with an organic phosphorus surface treatment agent.

Another feature of the present invention is a resin composition comprising a resin and the above-mentioned calcium carbonate filler for a resin.

Another feature of the present invention is the resin composition, wherein the above-mentioned resin is a polyester resin.

Another feature of the present invention is the resin composition, wherein the above-mentioned polyester resin is polyethylene terephthalate for light reflection.

Another feature of the present invention is the resin composition, wherein the resin composition is a film.

Advantageous Effects of Invention

The calcium carbonate filler for a resin of the present invention includes an extremely small amount of fine powders and has a particle size adjusted to a specific particle size, so that a volatile component such as water is likely to be degassed during kneading with a resin, and even when the filler is incorporated into a resin having high processing temperature at a high concentration, a problem of foaming or the like is not caused during molding. In particular, the calcium carbonate filler for a resin is useful in optical fields such as a light reflection plate for a liquid crystal that requires reflectivity and light resistance, a lamp reflector that requires an adhesion force to a metal film, glossiness and the like.

MODE FOR CARRYING OUT INVENTION

Figure 1:
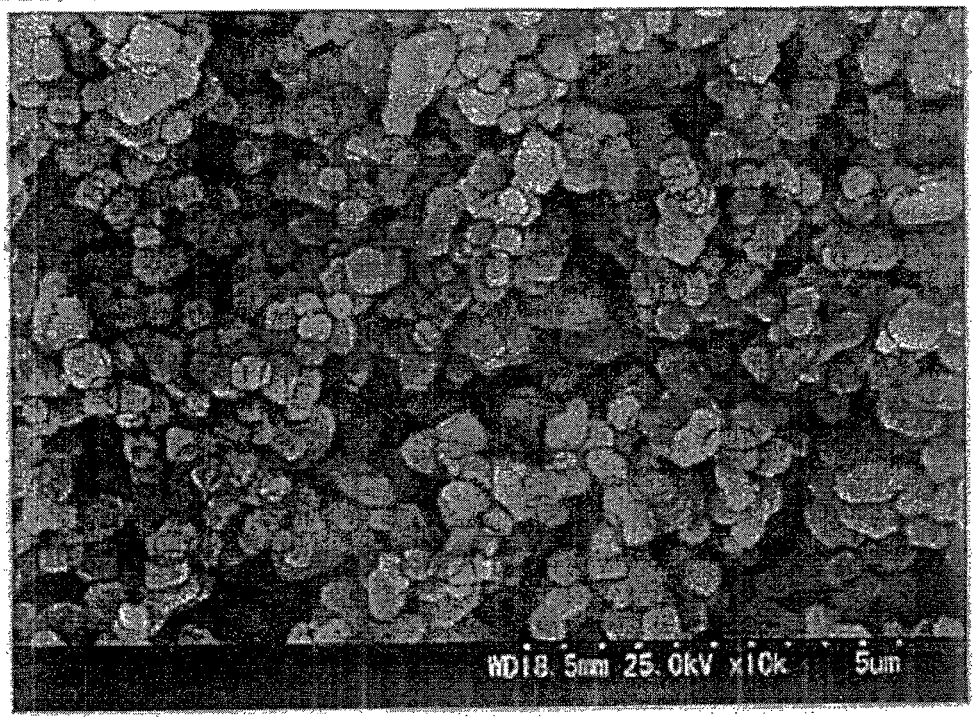
FIG. 1 shows a photograph (magnification: 10,000) of an electron microscope (SEM) diameter of a calcium carbonate filler for a resin obtained in Example 3.

The calcium carbonate filler for a resin of the present invention (hereinafter, referred to as calcium carbonate filler) has a feature in that a content rate of particles having a particle diameter of 0.26 μm or less is 30% or less in a number particle size distribution diameter measured (Mac-VIEW manufactured by Mountech Co., Ltd.) from an electron micrograph, and which satisfies the following expressions (a), (b), and (c):

$$Dms5/Dmv5 \leq 3.0 \quad (a)$$

$$1.0 \leq Sw \leq 10.0 \ (m^2/g) \quad (b)$$

$$Dma \leq 5.0 (\% \text{ by volume}) \quad (c)$$

wherein
Dms5: a 5% diameter (μm) accumulated from a small particle side in a volume particle size distribution measured with a laser diffraction particle size distribution measurement device (Microtrac MT-3300EX II manufactured by NIKKISO CO., LTD.);
Dmv5: a 5% diameter (μm) accumulated from a small particle side in a number particle size distribution in a particle diameter (Mac-VIEW manufactured by Mountech Co., Ltd.) measured with an electron microscope; Sw: a BET specific surface area (Macsorb manufactured by Mountech Co., Ltd.) (m²/g); and
Dma: a content rate (% by volume) of particles having a particle diameter of 3 μm or more in a volume particle size distribution measured with a laser diffraction particle size distribution measurement device (Microtrac MT-3300EX II manufactured by NIKKISO CO., LTD.).

In general, as a particle diameter is smaller, interparticle aggregability due to an intermolecular force or liquid cross-linking force caused by water is larger. In measurement of the particle diameter of a fine primary particle, it is very difficult to measure fine primary particles one by one with a general particle size distribution measurement device of a laser diffraction method or the like, and the particle diameter tends to be determined as the diameter of a large massive particle body which is a secondary aggregated body or a tertiary aggregated body formed by aggregation of primary particles. Even when the particles are preliminarily dispersed with an ultrasonic dispersion machine, it is very difficult that the primary particles are completely loosened and dispersed. Therefore, the general particle size distribution measurement device is unsuitable for precise measurement of a fine primary particle diameter of 0.26 μm or less.

Accordingly, a method of measuring a fine primary particle diameter in the present invention requires that, based on a number particle size distribution measured from an electron micrograph by observing particles one by one visually, the content rate of fine primary particles having a particle diameter of 0.26 μm or less is 30% or less in a particle size distribution thereof. When the content rate of the particles exceeds 30%, it is not only difficult to degas a volatile component such as water present in a surface of calcium carbonate during kneading with a resin, but also the particles easily adsorb moisture from the outside air. As a result, aggregability between calcium carbonate particles increases, and such particles cannot be used for the purpose and application of the present invention. Therefore, the content rate is more preferably 25% or less, and further preferably 20% or less. The lower limit of the content rate is not particularly limited, but is preferably as low as possible, and most preferably 0%.

A method for measuring a particle diameter from an electron micrograph using Mac-VIEW manufactured by Mountech Co., Ltd., is as follows.

<Measurement Method>

One to three grams of a calcium carbonate filler and 60 g of a methanol solvent are added and suspended in a beaker (100 mL), and preliminarily dispersed under a constant condition of a current of 300 μA for one minute using a chip-type ultrasonic dispersion machine (US-300T; manufactured by NIHONSEIKI KAISHA LTD.). The dispersion is then placed thinly and uniformly on a SEM sample stage using a 0.5 mL syringe, and dried to prepare a sample.

The prepared sample is observed with SEM at such magnification that 100 to 500 pieces can be counted, and contours of 100 to 500 particles are traced and counted in an order from an edge using a commercially available image analysis-type particle size distribution measurement software (Mac-VIEW manufactured by Mountech Co., Ltd.), to obtain a Heywood diameter (diameter equivalent to projected area circle). A particle size distribution is a number frequency, and 30% or less is number % per 100 to 500 particles.

Examples of an image observed with an electron microscope may include, but not particularly limited to, a SEM (scanning electron microscope) image, a TEM (transmission electron microscope) image, and an electric field emission type image thereof. In the present invention, the SEM image is used.

In the (a) expression of the present invention, it is necessary that a value obtained by dividing a 5% diameter (Dms5) (hereinafter may be referred to as laser diffraction diameter) accumulated from a small particle side in a volume particle size distribution measured with a laser diffraction particle size distribution measurement device (Microtrac MT-3300 EX II manufactured by NIKKISO CO., LTD.) by a 5% diameter (Dmv5) (hereinafter may be referred to as electron microscope diameter) accumulated from a small particle side in a number particle size distribution measured by observation with an electron microscope be 3.0 or less.

As described above, as the size of a primary particle is smaller, the particle retains a larger amount of water, and an aggregation-adhering force is firmer. Accordingly, in the case of a commercially available laser diffraction type, an aggregated and adhered secondary aggregate or tertiary aggregate is counted as one particle, and therefore, the diameter of each of primary particles observed from the image observed with an electron microscope is precisely counted and measured one by one, and for comparison between the laser diffraction diameter and the electron microscope diameter, a ratio of 5% diameters each accumulated from the small particle side is adopted.

When the (a) expression exceeds 3.0, that is, when a difference between the laser diffraction diameter and the electron microscope diameter is large, the content rate of fine particles is large. Therefore, the filler cannot be used for application aimed by the present invention. Accordingly, the (a) expression is preferably 2.0 or less, and further preferably 1.5 or less. The lower limit of the (a) expression is preferably closer to 1.0, and most preferably 1.0.

A method of measuring a volume particle size distribution with a laser diffraction particle size distribution measurement device (Microtrac MT-3300EX II manufactured by NIKKISO CO., LTD.) is as follows.

<Measurement Method>

A laser diffraction particle size distribution measurement device (Microtrac MT-3300EX II manufactured by NIKKISO CO., LTD.) is used, and methanol is used as a solvent. In order to make suspension of the calcium carbonate filler for a resin of the present invention constant before measurement, as pre-treatment, 0.1 to 0.3 g of a calcium carbonate filler and 60 mL of a methanol solvent are added and suspended in a beaker (100 mL), and preliminarily dispersed under a constant condition of a current of 300 μA for one minute using a chip-type ultrasonic dispersion machine (US-300T; manufactured by NIHONSEIKI KAISHA LTD.), and a measured value is then obtained.

The (b) expression of the present invention represents the size of each particle of the calcium carbonate filler as a BET specific surface area (Sw), and it is necessary that the BET specific surface area be 1.0 to 10.0 $m^2/g$. When Sw exceeds 10.0 $m^2/g$, calcium carbonate contains a large amount of a volatile component such as water. Therefore, there is a problem of degassing during kneading with a resin. When Sw is less than 1.0 $m^2/g$, in the case where the calcium carbonate filler is incorporated into a resin, a particle of the calcium carbonate filler is large so that it is difficult to uniformly mix the calcium carbonate filler with a resin. Even if the filler is mixed with a resin, there is a problem that the calcium carbonate filler is dropped from a resin molded body. When the filler is used as the micropore-forming agent for a light reflection film, there is also a problem that the micropore diameter is too large. Accordingly, the specific surface area is more preferably 2.0 to 9.0 $m^2/g$, and further preferably 3.0 to 8.0 $m^2/g$.

A method of measuring a BET specific surface area with a BET specific surface area measurement device (Macsorb manufactured by Mountech Co., Ltd.) is as follows.

<Measurement Method>

In a measurement device was set 0.2 to 0.3 g of a calcium carbonate filler, and as pre-treatment, heat treatment at 200° C. for 10 minutes was performed under an atmosphere of a mixed gas of nitrogen and helium, and then low temperature low humidity physical adsorption was preformed under the environment of liquid nitrogen to measure a specific surface area.

In the (c) expression of the present invention, it is necessary that the content rate of particles having a particle diameter of 3 μm or more be 5.0% by volume or less in a volume particle size distribution measured with a laser diffraction particle size distribution measurement device (Microtrac MT-3300EX II manufactured by NIKKISO CO., LTD.).

As described above, in order to incorporate the filler into a resin having high processing temperature at a high concentration, which is the purpose and application of the present invention, when the filler having specific particle diameter and specific surface area described above is used, a volatile component can be removed during kneading with a resin, and foamability of the resin can be sufficiently suppressed. However, if the amount of a calcium carbonate filler having a particle diameter of 3 μm or more is large when the filler is used in a micropore-forming agent, etc. for a light reflection film for a liquid crystal television, the filler does not contribute to reflectivity and incorporation at a high concentration tends to become difficult in terms of properties of light reflectivity. Therefore, the content rate is more preferably 3.0% by volume or less, and further preferably 1.5% by volume or less.

The method of measuring a volume particle size distribution with a laser diffraction particle size distribution measurement device (Microtrac MT-3300EX II manufactured by NIKKISO CO., LTD.) is as described above.

As calcium carbonate used in the present invention, calcium carbonate obtained by a synthesis method of firing natural gray dense limestone is used rather than calcium carbonate obtained by a pulverization method from natural white saccharoidal limestone (heavy calcium carbonate) that contains a large amount of fine particles from the viewpoint of degassing property during kneading with a resin. This is because the particles can be uniformly controlled and impurities can be relatively removed. Therefore, a synthesized product (light, colloidal calcium carbonate) is preferred.

In order to improve the properties of the calcium carbonate filler, the calcium carbonate filler of the present invention can be surface-treated (coated) with various surface treatment agents, if necessary.

Examples of the surface treatment agent include, but not particularly limited to an organic phosphorus surface treatment agent, a polycarboxylic acid surface treatment agent, and a coupling agent surface treatment agent. The surface treatment agents may be used for surface treatment alone or if necessary, in combination of two or more kinds thereof.

Examples of the organic phosphorus surface treatment agent include organic phosphate esters such as 1-hydroxyethylidene-1,1-diphosphonic acid (HEDP), nitrilotrismethylenephosphonic acid (NTMP), trimethyl phosphate (TMP), triethyl phosphate (TEP), tributyl phosphate (TBP), triphenyl phosphate (TPP), methyl acid phosphate (MAP), and ethyl acid phosphate (EAP). The surface treatment agents may be used alone or in combination of two or more kinds thereof.

Examples of the polycarboxylic acid surface treatment agent include monocarboxylic acids such as polyacrylic acid, methacrylic acid and crotonic acid, and dicarboxylic acids such as itaconic acid, maleic acid and fumaric acid. The surface treatment agents may be used alone or in combination of two or more kinds thereof. A copolymer with a functional group such as polypropylene glycol (PPG) and polyethylene glycol (PEG) can be used without any problem.

Examples of the coupling agent surface treatment agent include silane coupling agents such as vinyltrimethoxysilane and N-2-(aminoethyl)-3-aminopropyltrimethoxysilane, titanate coupling agents typified by isopropyltriisostearoyl titanate, and silicone oil typified by methyl hydrogen silicone oil. The surface treatment agents may be used alone or in combination of two or more kinds thereof.

Among the surface treatment agents, from the viewpoints of compatibility to a resin, heat resistance and degassing property, a polyacrylic acid-based ammonium salt (APA), nitrilotrismethylenephosphonic acid (NTMP), trimethyl phosphate (TMP), triethyl phosphate (TEP), and a silicone treatment agent are preferred. In particular, in the case of a polyester resin having an ester bond, since alkali resistance is low, the above-mentioned surface treatment agents are suitable.

An amount of the surface treatment agent to be used varies depending on the specific surface area of calcium carbonate, a compound condition, and the like, and for this reason, it is difficult to define the amount unconditionally. However, it is preferable that the amount be usually 0.01 to 5% by weight based on calcium carbonate from the purpose and application of the present invention. When the amount to be used is less than 0.01% by weight, a sufficient surface treatment effect is difficult to be achieved. On the other hand, when the surface treatment agent is added in an amount exceeding 5% by weight, a problem such that the hue of a resin turns yellow due to decomposition and volatilization of the surface treatment agent during kneading with a resin may arise. Therefore, the amount is more preferably 0.05 to 3% by weight, and further preferably 0.1 to 1.5% by weight.

A method for surface-treating calcium carbonate may be, for example, a dry treatment method for directly mixing the surface treatment agent with a calcium carbonate powder using a mixer such as a super mixer, a Henschel mixer, a tumbler mixer, a kneader and a Banbury mixer, and if necessary, heating the mixture to perform surface treatment; a wet treatment method for dissolving the surface treatment agent in a water solvent, and adding the solution to an aqueous calcium carbonate suspension to perform surface treatment, followed by dehydration and drying; or a method in which both the treatment methods are combined and a cake obtained by dehydration of the aqueous calcium carbonate suspension is surface-treated.

The resin composition of the present invention will be described below.

A resin used in the present invention may be, of course, various resins having low processing temperature, but a resin having relatively high processing temperature is suitable. Examples of the resin may include general-purpose resins typified by an acrylic resin (PMMA), polyvinyl alcohol (PVA), polyvinylidene chloride (PVDC), polybutadiene (PBD) and polyethylene terephthalate (PET); engineering plastics such as polyacetal (POM), polyamide (PA), polycarbonate (PC), modified polyphenylene ether (PPE), polybutylene terephthalate (PBT), ultra high molecular weight polyethylene (UHPE), polysulfone (PSF), polyether sulfone (PES), polyphenylene sulfide (PPS), polyarylate (PAR), polyether ether ketone (PEEK), polyimide (PI), polyetherimide (PET), a fluororesin (FR) and a liquid crystal polymer (LCP); and thermosetting resins such as phenol, urea, melamine, alkyd, unsaturated polyester, epoxy, diallyl phthalate, polyurethane, modified silicone, polysulfide, reactive acryl, polyisobutylene, silylated urethane and modified epoxy. Further, biodegradable plastics such as a polylactic acid resin, polybutylene succinate, polyamide 11, and polyhydroxybutyric acid or biomass plastics can be also used.

Among them, polyester resins having an ester bond such as PET, PBT, PEN, PC and LCP have high versatility as sheet and film processed products, and PET is particularly suitable for the purpose and application of the present invention.

A ratio of incorporating the surface-treated calcium carbonate filler for a resin of the present invention and a resin considerably varies depending on the kinds and applications of the resin, desired physical properties and cost, and may be appropriately determined depending on them. However, from the purpose of incorporation at a high concentration, for example, when used as a porous film for light reflection, the ratio is usually 6 to 200 parts by weight, more preferably 10 to 150 parts by weight, and further preferably 20 to 120 parts by weight based on 100 parts by weight of the resin.

In order to improve the properties of the resin composition, a lubricant such as fatty acid amide, ethylenebis(stearic acid amide), or sorbitan fatty acid ester, a plasticizer, a stabilizer, an antioxidant, or the like may be added, if necessary, within a range not impairing efficacy of the resin composition of the present invention. Further, additives generally used in a resin composition for a film, for example, a lubricant, an antioxidant, a fluorescent brightening agent, a thermal stabilizer, a light stabilizer, an ultraviolet radiation absorber, a neutralizer, an antifogging agent, an antiblocking agent, an antistatic agent, a slipping agent and a colorant may be incorporated.

When the calcium carbonate filler of the present invention and various additives are incorporated into a resin, they are mixed using a known mixer such as a super mixer, a Henschel mixer, a tumbler mixer, or a ribbon blender.

The resin composition is mixed with the mixer, and then heat-kneaded with a monoaxial or biaxial extruder, a kneader, or a Banbury mixer, to prepare once pellets containing various additives including the calcium carbonate filler of the present invention, which are referred to as master batch. The pellets are melted using a known molding machine such as T-die extrusion or inflation molding, to form a film. Subsequently, if necessary, the film may be monoaxially or biaxially stretched to form a film product having a uniform pore diameter.

If necessary, a plurality of steps until T-die extrusion can be combined in the above-mentioned steps to form a film into a multilayer structure during extrusion; or to introduce a step of bonding films together at stretching, and stretching the films again to form a multilayer film; or to conduct film aging at a temperature condition under which a temperature is higher than normal temperature and lower than the melting temperature of a resin.

For the purpose of imparting printability to the above-mentioned film, a film surface may be subjected to surface treatment with plasma discharge or the like to form an ink-receiving layer thereon, or a liquid of heat-resistant resin such as aromatic para-aramid, polyphenylene sulfide (PPS), and polyether ether ketone (PEEK) resin in an organic solvent may be coated on at least one side of the film as a coating liquid to form a protective layer, without any problem.

The calcium carbonate filler of the present invention may be dissolved in hydrochloric acid or the like that dissolves calcium carbonate and a surface treatment agent to form a porous film product having only fine pores, without any problem.

EXAMPLES

Hereinafter, the present invention will be described specifically by way of Examples and Comparative Examples. However, the present invention is not limited by the Examples and Comparative Examples at all.

Example 1

Quick lime obtained by firing gray dense limestone in a coma furnace type kiln (a top type lime kiln) using kerosene as a heat source was dissolved to prepare a slaked lime slurry having a volume of 1,000 L, a specific gravity of 1.040 and a temperature of 30° C. Subsequently, carbon dioxide having a purity of 99% or more was allowed to pass through the slurry at a gas flow rate of 50 m$^3$/hour, so that calcium carbonate was synthesized. A BET specific surface area in this case was 12 m$^2$/g. The calcium carbonate water slurry was subjected to particle growth by Ostwald aging to obtain a calcium carbonate water slurry having a BET specific surface area of 10.4 m$^2$/g. The calcium carbonate water slurry was dehydrated and dried with a filter press machine and an airborne dryer.

Trimethyl phosphate (TMP) in an amount corresponding to 1.0% by weight based on calcium carbonate was then subjected to dry treatment using a Henschel mixer at a treatment temperature of 120° C., followed by classification using a precision air classification machine (turbo classifier) to prepare a calcium carbonate filler for a resin (hereinafter referred to as calcium carbonate filler). The powder physical properties of the obtained calcium carbonate filler and the main implementation conditions are shown in Table 1.

Example 2

A calcium carbonate filler was prepared by an operation performed under the same condition as that of Example 1 except that the calcium carbonate water slurry was subjected to particle growth by Ostwald aging to obtain a calcium carbonate water slurry having a BET specific surface area of 7.8 m$^2$/g, then a dried powder was prepared, and after that, trimethyl phosphate (TMP) in an amount corresponding to 0.8% by weight based on calcium carbonate was treated using a Henschel mixer. The powder physical properties of the obtained calcium carbonate filler and the main implementation conditions are shown in Table 1.

Example 3

A calcium carbonate filler was prepared by an operation performed under the same condition as that of Example 1 except that the calcium carbonate water slurry was subjected to particle growth by Ostwald aging to obtain a calcium carbonate water slurry having a BET specific surface area of 5.3 m$^2$/g, the calcium carbonate water slurry was dehydrated by pressing, and after that, trimethyl phosphate (TMP) in an amount corresponding to 0.5% by weight based on calcium carbonate was treated using a kneader, followed by drying with an airborne dryer. The powder physical properties of the obtained calcium carbonate filler and the main implementation conditions are shown in Table 1.

A photograph (magnification: 10,000) of observation of electron microscope (SEM) diameter is shown in FIG. 1.

Example 4

A calcium carbonate filler was prepared by an operation performed under the same condition as that of Example 1 except that the calcium carbonate water slurry was subjected to particle growth by Ostwald aging to obtain a calcium carbonate water slurry having a BET specific surface area of 3.4 m$^2$/g, and an ethyl acid phosphate (EAP) ammonia neutralization product in an amount corresponding to 0.5% by weight was treated using a tumbler mixer. The powder physical properties of the obtained calcium carbonate filler and the main implementation conditions are shown in Table 1.

Example 5

A calcium carbonate filler was prepared by an operation performed under the same condition as that of Example 3 except that the surface treatment agent was changed to nitrilotrismethylenephosphonic acid (NTMP) in an amount corresponding to 0.5% by weight based on calcium carbonate in Example 3. The powder physical properties of the obtained calcium carbonate filler and the main implementation conditions are shown in Table 1.

Example 6

A calcium carbonate filler was prepared by an operation performed under the same condition as that of Example 3 except that the surface treatment agent was changed to polyacrylic acid ammonium (APA) in an amount corresponding to 0.5% by weight based on calcium carbonate in Example 3. The powder physical properties of the obtained calcium carbonate filler and the main implementation conditions are shown in Table 1.

Example 7

A calcium carbonate filler was prepared by an operation performed under the same condition as that of Example 3 except that surface treatment was not performed in Example 3. The powder physical properties of the obtained calcium carbonate filler and the main implementation conditions are shown in Table 1.

Example 8

A calcium carbonate filler was prepared by an operation performed under the same condition as that of Example 5 except that a precision air classification machine (turbo classifier) was not used in Example 5. The powder physical properties of the obtained calcium carbonate filler and the main implementation conditions are shown in Table 1.

Comparative Example 1

Commercially available heavy calcium carbonate (#2000, available from MARUO CALCIUM CO., LTD.) was classified with a precision air classification machine and heavy calcium carbonate of crude powder was collected. Trimethyl phosphate (TMP) in an amount corresponding to 0.5% by weight based on calcium carbonate was then subjected to dry treatment using a Henschel mixer at a treatment temperature of 120° C., to prepare a calcium carbonate filler. The powder physical properties of the obtained calcium carbonate filler and the main implementation conditions are shown in Table 1.

Trimethyl phosphate (TMP) in an amount corresponding to 1.0% by weight based on calcium carbonate was subjected to dry treatment using a Henschel mixer at a treatment temperature of 120° C., followed by classification with a precision air classification machine (turbo classifier) to prepare a calcium carbonate filler. The powder physical properties of the obtained calcium carbonate filler and the main implementation conditions are shown in Table 1.

Comparative Example 3

A calcium carbonate filler was prepared by an operation performed under the same condition as that of Example 4 except that the calcium carbonate water slurry was subjected to particle growth by Ostwald aging to obtain a calcium carbonate water slurry having a BET specific surface area of 0.7 $m^2/g$, and trimethyl phosphate (TMP) was treated using a Henschel mixer. The powder physical properties of the obtained calcium carbonate filler and the main implementation conditions are shown in Table 1.

<Water Amount>

A water amount in a calcium carbonate filler was measured by the following method.

A trace amount water measurement device (MKS-1s is manufactured by Kyoto Electronics Manufacturing Co., Ltd.) was used. Fifty grams of a dehydrated solvent (AQUA-MICRON solvent CM available from Mitsubishi Chemical Corporation) was weighed in a cell attached to the trace amount water measurement device, 0.1 to 1 g of a calcium carbonate filler was added in the cell, and the mixture was titrated with 3 mg of a Karl Fischer solution (AQUAMI-CRON Titrant SS available from Mitsubishi Chemical Corporation). From a titration value, a water amount value was read.

TABLE 1

| Items | | Examples | | | | | | | | Comparative Examples | | |
|---|---|---|---|---|---|---|---|---|---|---|---|---|
| | | 1 | 2 | 3 | 4 | 5 | 6 | 7 | 8 | 1 | 2 | 3 |
| Content rate of particles (0.26 μm or less) | (%) | 28 | 14 | 2 | 1 | 2 | 4 | 1 | 0 | 45 | 44 | 0 |
| (a) Dms5/Dmv5 | — | 1.2 | 1.3 | 1.3 | 1.4 | 2.0 | 1.4 | 1.3 | 2.3 | 5.4 | 1.3 | 2.3 |
| (b) Sw | ($m^2/g$) | 9.3 | 7.1 | 4.8 | 3.2 | 3.0 | 3.2 | 4.8 | 3.0 | 3.8 | 12 | 0.7 |
| (c) Dma | (%) | 0.1 | 0.2 | 0.3 | 0.5 | 1.3 | 0.5 | 0.3 | 4.1 | 5.7 | 2.4 | 31.0 |
| Surface treatment agent | — | TMP | TMP | TMP | EAP Ammo | NTMP | APA | — | TMP | TMP | TMP | TMP |
| Treated amount | (wt. %) | 1.0 | 0.8 | 0.5 | 0.5 | 0.5 | 0.5 | — | 0.5 | 0.5 | 1.0 | 0.5 |
| Calcium carbonate | | synthesis | synthesis | synthesis | synthesis | synthesis | synthesis | synthesis | synthesis | natural | synthesis | synthesis |
| Water amount | % | 0.5 | 0.4 | 0.3 | 0.2 | 0.4 | 0.4 | 0.3 | 0.3 | 0.5 | 0.7 | 0.2 |

Figure 2:
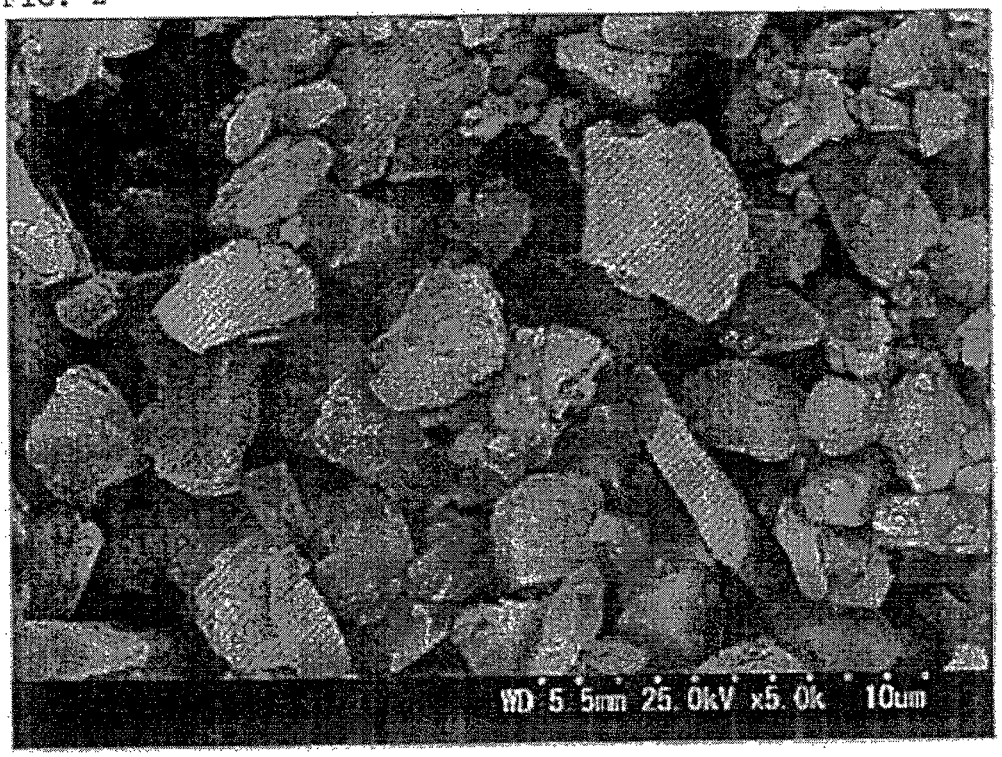
FIG. 2 shows a photograph (magnification: 5,000) of an electron microscope (SEM) diameter of a calcium carbonate filler for a resin obtained in Comparative Example 1.

TMP: Trimethyl phosphate
EAP Ammo: Ethyl acid phosphate ammonia neutralization product
NTMP: Nitrilotrismethylene phosphonic acid
APA: Polyacrylic acid ammonium
Water amount: Water amount (%) by the Karl Fischer volume method A photograph (magnification: 5,000) of observation of electron microscope (SEM) diameter is shown in FIG. 2. As compared with the calcium carbonate filler in Example 3 (FIG. 1), it is recognized that there are more fine powders.

Comparative Example 2

The synthesized calcium carbonate water slurry having a BET specific surface area of 12 $m^2/g$ prepared in Example 1 before Ostwald aging was dehydrated and dried with a filter press machine and an airborne dryer.

Examples 9 to 16 and Comparative Examples 4 to 6

<White PET Resin Film>

Sixty parts by weight of polyethylene terephthalate (PET) (specific gravity: 1.39; available from NIPPON POLY-PENCO LTD.) and 30 parts by weight of a calcium carbonate filler for a resin were mixed and stirred using a Henschel mixer and sufficiently dispersed. The mixture was then granulated using a kneading extruder (LABO PLASTO-MILL 2D25W; manufactured by Toyo Seiki Seisaku-sho, Ltd.) at 280° C. to prepare pellets. The pellets were dried at 110° C. for one hour, extruded using a film extruder (LABO PLASTOMILL D2025; manufactured by Toyo Seiki Seisaku-sho, Ltd.) at 290° C. from a T-die into a sheet, and cooled and solidified by a cooling drum of 30° C. to obtain an unstretched film.

The unstretched film was then heated at 95° C. to be stretched at 3.3-fold in a MD direction (extrusion direction), further heated at 120° C. to be stretched at 3-fold in a TD direction (transverse direction) using a tenter stretching machine, so that a film with a thickness of 180 μm was obtained. The physical properties of the resulting film were evaluated by the following method. The results of the evaluation are shown in Table 2.

<Moldability>

Upon extrusion molding, whether stable extrusion is possible or not was observed, and moldability was evaluated based on the following criteria:

⊙: Viscosity during extrusion molding is low, torque is stable, and discharged amount is constant.

○: Viscosity during extrusion molding is slightly high, but torque and discharged amount are stable.

Δ: Viscosity during extrusion molding is high, and torque and discharged amount are unstable, but pellets can be obtained.

X: Viscosity during extrusion molding is high, torque is unstable, and foaming occurs during discharging. Pellets are not obtained.

<Dispersibility of Particles>

A fish eye due to agglomerates or coarse and large particles was visually observed on a film of 300 mm×300 m, and evaluated based on the following criteria:

⊙: No fish eye is found.

○: One or two fish eye(s) is/are found.

Δ: Three or more and less than ten fish eyes are found.

X: Ten or more fish eyes are found.

<Bubble (Gas Mark)>

A bubble (gas mark) due to a volatile component such as water was visually observed on a film of 300 mm×300 m, and evaluated based on the following criteria:

⊙: No bubble is found.

○: One or two bubble(s) is/are found.

Δ: Three or more and less than ten bubbles are found.

X: Ten or more bubbles are found.

3) Reflectivity

Using an ultraviolet-visible spectroscopy (UV3101PC: manufactured by Shimadzu Corporation), reflectivity at a wavelength range of 0.30 to 0.80 μm was measured when reflectivity of a barium sulfate white plate is 100%, and reflectivity at 0.45 μm was determined as a representative value. It can be said that as the reflectivity is higher, a uniform void diameter is obtained in the above-mentioned wavelength range.

4) Light Resistance

Reflectivity was measured with a solar simulator (YSS-50A; manufactured by Yamashita Denso Corporation) after irradiation for 120 hours. It can be said that as the light resistance is higher, the film is high in stability of a light reflection film.

TABLE 2

| | Examples | | | | | | | | Comparative Examples | | |
|---|---|---|---|---|---|---|---|---|---|---|---|
| | 9 | 10 | 11 | 12 | 13 | 14 | 15 | 16 | 4 | 5 | 6 |
| | Example or Comp. Example Nos. of calcium carbonate filler used | | | | | | | | | | |
| Items | 1 | 2 | 3 | 4 | 5 | 6 | 7 | 8 | 1 | 2 | 3 |
| Moldability | ○ | ○ | ⊙ | ○ | ○ | ○ | Δ | ○ | X | Δ | ○ |
| Dispersibility of particles | Δ | ○ | ⊙ | ○ | ○ | ○ | Δ | ○ | X | Δ | ○ |
| Bubble (gas mark) | Δ | ○ | ⊙ | ○ | Δ | ○ | Δ | ○ | X | X | ⊙ |
| Reflectivity | 92 | 94 | 97 | 95 | 94 | 93 | 91 | 92 | 80 | 85 | 74 |
| Light resistance | 90 | 91 | 96 | 93 | 92 | 90 | 87 | 90 | 78 | 82 | 72 |

As seen from the above results, it is recognized that the calcium carbonate filler of the present invention is excellent in moldability, dispersibility, bubbles (gas mark), and optical characteristics such as reflectivity and light resistance in the case of being incorporated into a PET resin or the like to form a resin composition.

INDUSTRIAL APPLICABILITY

The calcium carbonate filler for a resin of the present invention includes an extremely small amount of fine powders and has a particle size adjusted to a specific particle size, so that a volatile component such as water present in a surface of calcium carbonate is likely to be degassed even when the filler is incorporated into and kneaded with a resin having high processing temperature at a high concentration, and foaming or the like can be suppressed. In particular, the calcium carbonate filler for a resin is useful in optical fields such as a light reflection plate for a liquid crystal that requires reflectivity and light resistance, a lamp reflector that requires an adhesion force to a metal film and glossiness, and the like.

The invention claimed is:

1. A calcium carbonate filler for a resin, in which a content rate of particles having a particle diameter of 0.26 μm or less is 30% or less in a number particle size distribution diameter measured (Mac-VIEW manufactured by Mountech Co., Ltd.) from an electron micrograph, and which satisfies the following expressions (a), (b), and (c):

$Dms5/Dmv5 \leq 3.0$ (a)

$1.0 \leq Sw \leq 10.0 \; (m^2/g)$ (b)

$Dma \leq 5.0 (\% \text{ by volume})$ (c)

wherein

Dms5: a 5% diameter (μm) accumulated from a small particle side in a volume particle size distribution measured with a laser diffraction particle size distribution measurement device (Microtrac MT-3300EX II manufactured by NIKKISO CO., LTD.);

Dmv5: a 5% diameter (μm) accumulated from a small particle side in a number particle size distribution in a particle diameter (Mac-VIEW manufactured by Mountech Co., Ltd.) measured with an electron microscope;

Sw: a BET specific surface area (Macsorb manufactured by Mountech Co., Ltd.) (m²/g); and Dma: a content rate (% by volume) of particles having a particle diameter of 3 μm or more in a volume particle size distribution measured with a laser diffraction particle size distribution measurement device (Microtrac MT-3300EX II manufactured by NIKKISO CO., LTD.).

2. The calcium carbonate filler for a resin according to claim 1, wherein the calcium carbonate filler is surface-treated with an organic phosphorus surface treatment agent.

3. A resin composition comprising a resin and the calcium carbonate filler for a resin as defined in claim 1.

4. A resin composition comprising a resin and the calcium carbonate filler for a resin as defined in claim 2.

5. The resin composition according to claim 3, wherein the resin is a polyester resin.

6. The resin composition according to claim 4, wherein the resin is a polyester resin.

7. The resin composition according to claim 5, wherein the polyester resin is polyethylene terephthalate for light reflection.

8. The resin composition according to claim 6, wherein the polyester resin is polyethylene terephthalate for light reflection.

9. The resin composition according to claim 3, wherein the resin composition is a film.

10. The resin composition according to claim 4, wherein the resin composition is a film.

\* \* \* \* \*